United States Patent [19]
Thakkar et al.

[11] Patent Number: 5,676,744
[45] Date of Patent: Oct. 14, 1997

[54] PROCESS FOR IMPROVING DRIED FILM RESISTIVITY OF CARBON PIGMENT INK JET INKS

[75] Inventors: Sharad R. Thakkar; Rodney G. Mader; Raouf Botros, all of Dayton, Ohio

[73] Assignee: Scitex Digital Printing, Inc., Dayton, Ohio

[21] Appl. No.: 746,156

[22] Filed: Nov. 6, 1996

Related U.S. Application Data

[63] Continuation-in-part of Ser. No. 434,595, May 4, 1995, abandoned.
[51] Int. Cl.⁶ .................................................. C09D 11/02
[52] U.S. Cl. ............................... 106/20 R; 106/20 D
[58] Field of Search .............................. 106/20 R, 20 D

[56] References Cited

U.S. PATENT DOCUMENTS

| | | | |
|---|---|---|---|
| 5,268,027 | 12/1993 | Chan et al. | 106/20 R |
| 5,302,197 | 4/1994 | Wickramanayke et al. | 106/20 R |
| 5,324,349 | 6/1994 | Sanno et al. | 106/20 R |
| 5,356,464 | 10/1994 | Hickman et al. | 106/20 R |
| 5,376,169 | 12/1994 | Hotomi et al. | 106/20 D |
| 5,417,747 | 5/1995 | Arata et al. | 106/20 D |
| 5,439,514 | 8/1995 | Kashiwazaki et al. | 106/20 C |

*Primary Examiner*—Helene Klemanski
*Attorney, Agent, or Firm*—Barbara Joan Haushalter

[57] ABSTRACT

An ink jet ink composition comprises a liquid vehicle, a pigment, a pH adjusting component, and a chemical with a plurality of electron donating groups. The chemical with a plurality of electron donating groups comprises a chemical with at least three electron donating groups, wherein the at least three electron donating groups are situated in close proximity to provide high dried film resistivity. With the present invention, significant improvement in dried film resistivity of carbon pigment ink jet inks is achieved, sufficient to eliminate charge lead to charge lead shorts and improve machine runnability and can, therefore, be used in ink jet printers.

8 Claims, 2 Drawing Sheets

PROCESS FOR IMPROVING DRIED FILM RESISTIVITY OF CARBON PIGMENT INK JET INKS

This is a continuation-in-part of application Ser. No. 08/434,595, filed May 4, 1995 now abandoned.

TECHNICAL FIELD

The present invention relates to pigment inks and, more particularly, to a process for improving dried film resistivity of pigment ink jet inks.

BACKGROUND ART

In continuous ink jet printing, ink is supplied under pressure to a manifold region that distributes the ink to a plurality of orifices, typically arranged in a linear array(s). The ink discharges from the orifices in filaments which break into droplet streams. The approach for printing with these droplet streams is to selectively charge and deflect certain drops from their normal trajectories. Graphic reproduction is accomplished by selectively charging and deflecting drops from the drop streams and depositing at least some of the drops on a print receiving medium while other of the drops strike a drop catcher device. The continuous stream ink jet printing process is described, for example, in U.S. Pat. Nos. 4,255,754; 4,698,123 and 4,751,517, the disclosures of each of which are totally incorporated herein by reference.

In the ink jet printing art, water soluble dyes are desirable for runnability. However, waterfast inks are highly desirable for producing permanent images. Decreasing the solubility of the dye increases the waterfastness, and vice versa. In the continuous ink jet industry, desire to obtain permanent ink (100% waterfastness and 100% wet rubfastness) has been in existence for some time. Although this has been achieved by some continuous ink jet manufacturers (EJ-101 ink by Elmjet, VT-16-2000 ink by Videojet and Admark Fast Black Ink by Eastman Kodak Company and Scitex Digital Printing, Inc.) all of these inks are solvent based inks. Ideally, industry would prefer an aqueous ink with permanence qualities.

Current state-of-the-art aqueous ink jet inks utilize water soluble dyes to attain acceptable redissolvability of the dried ink on the orifice plate. This redissolvability is essential for good machine runnability as well as start-up for continuous ink jet printers which do not have a separate printhead cleaning fluid mechanism.

Current dye based inks utilize dyes which are water soluble (at least with limited solubility) which affects waterfastness negatively. With dye based inks, then, there is an issue of redissolvability. A water based pigment ink on the other hand, may be able to provide waterfastness as pigments are dispersed rather than dissolved. For pigment inks, then, redispersion, rather than redissolvability, must be achieved to have good system start-up. Use of pigments rather than dyes creates some further complications which are not present with dyes. For example, dye based inks provide dry film which has high dried film resistivity. Pigment based inks, particularly black inks, on the other hand, provide films which are conductive.

It is seen then that there is a need for a process for improving dried film resistivity of pigment ink jet inks.

SUMMARY OF THE INVENTION

This need is met by the process according to the present invention, which is a process of making carbon pigment (rather than conventional dye-based) aqueous ink jet ink which provides improved dried film resistivity of carbon pigment ink jet inks. The carbon pigment aqueous ink jet ink of the present invention achieves a dry ink film resistivity which is increased to an acceptable level so as to have acceptable print quality without any "moisture shorts", or charge lead to charge lead shorts. By incorporating chemicals such as 1, 2, 6, trihydroxy hexane, which are presumed to adsorb at the carbon surface, dried ink film resistivity is increased to an acceptable level whereby no charge lead to charge lead short print defect is observed during printing. Trihydroxy compounds, of course, have three hydroxyl groups. It is preferred, then, that the chemical with a plurality of electron donating groups in fact is a chemical with three or four hydroxyl groups.

In accordance with one aspect of the present invention, an ink jet ink composition comprises a liquid vehicle, a carbon pigment, a pH adjusting component, and a chemical with a plurality of electron donating groups preferably less than five. Dried ink film resistivity of aqueous carbon pigment ink formulated in accordance with this composition is improved by being increased to a level whereby no charge lead to charge lead shorts which cause print defects are observed during printing.

Other objects and advantages of the invention will be apparent from the following description and the appended claims.

DETAILED DESCRIPTION OF THE INVENTION

The present invention provides for a waterfast ink composition wherein the ink is a carbon pigment, rather than a conventional dye-based, aqueous ink jet ink which provides improved dried film resistivity of carbon pigment ink jet inks.

Conventional aqueous dye based inks are made using dyes which are at least having limited solubility in an aqueous medium. Hence, in an ink, there exists a "true" solution of dye in the medium. When this particular ink is dried, the film formed has very high dry film resistivity.

With some carbon pigment inks, when a film is formed, the dried film shows fairly low dry film resistance, as illustrated in Example 1, below. This is presumably due to the interparticle connection at the bare carbon particle surface. This then provides at least one path wherein particles are connected at the "bare" surface (without any adsorbate) of carbon particles. This causes low dried film resistivity with the negative result of charge lead to charge lead shorts.

The present invention specifically relates to elimination of this limitation for carbon pigment inks. According to the method of the present invention, dried film resistivity of carbon pigment inks can be increased sufficiently to avoid any charge lead to charge lead shorts.

Figure 1A:
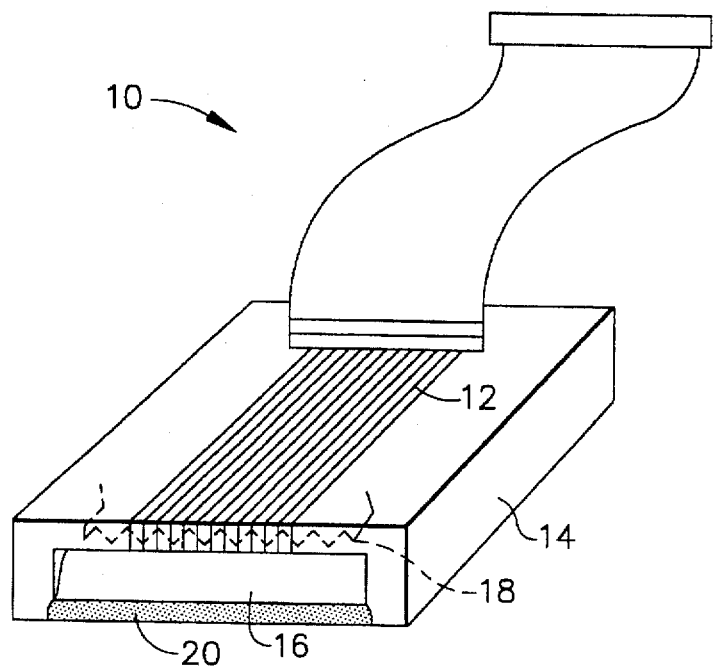
FIGS. 1A and 1B illustrate a typical ink jet print head catcher assembly.
Figure 1B:
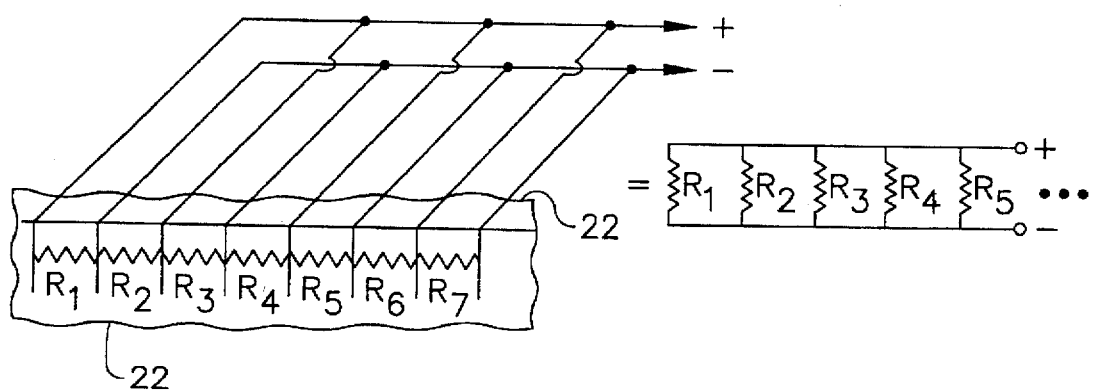

Referring now to the drawings, FIG. 1A illustrates a typical ink jet print head catcher assembly 10. There are typically approximately 128 individual charging electrodes 12 bonded to a molded plastic catcher 14 in close proximity to the electrodes. During a typical ink jet start up, it is desirable to flush the charge electrodes with ink to remove any debris or ink residues. It is also necessary that the electrodes be isolated from each other after the start up procedure is finished, so that it is possible to control each electrode with either a high voltage (to charge or "catch" an ink droplet, at catch surface 16) or ground (not charging an ink droplet, i.e., printing the ink droplet), without affecting another electrode (and corresponding droplet). A catcher heater 18 is utilized to achieve both of these objectives by drying ink and/or condensation from the electrodes and then maintaining the electrode temperature above the dew point. A vacuum chamber 20 removes ink or fluid off the leads during start up. The drying and maintaining process of the catcher heater 18 inherently leaves a thin film of ink 22, as shown in FIG. 1B, which dries upon application of heat through a catcher heater. This demands a requirement of an ink formulation to have a high dried ink film resistance, indicated as resistors R1–R7 in FIG. 1B, in order to maintain enough isolation between electrodes.

Figure 2:
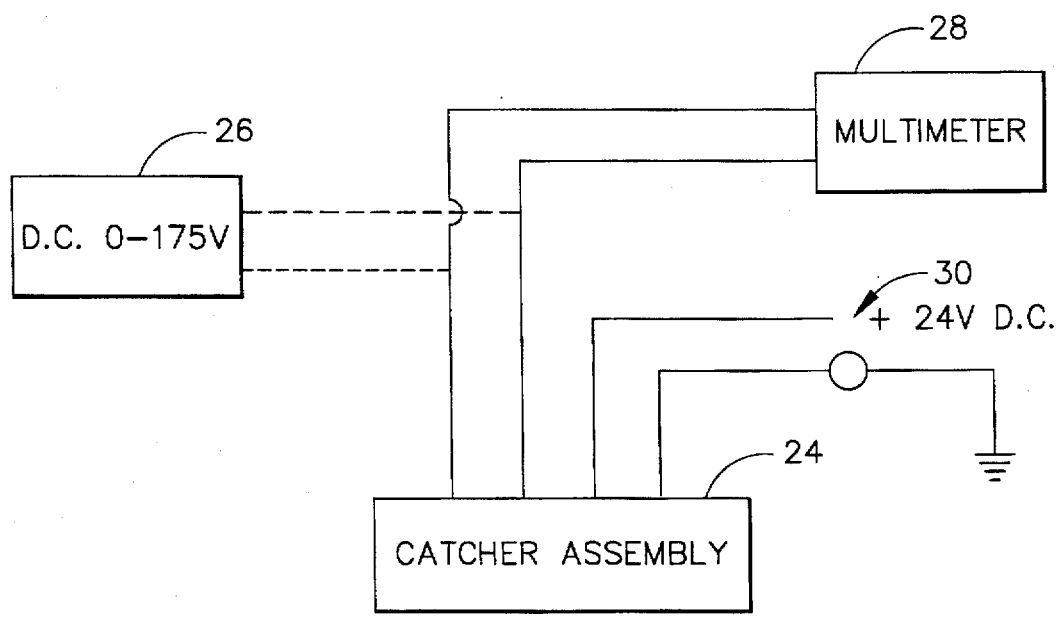
FIG. 2 illustrates a schematic block diagram of a catcher assembly.

In order to evaluate this characteristic of ink formulations, a test apparatus was developed which is shown schematically in FIG. 2. This closely duplicates the effect of running the ink in the typical planar charge ink jet print head. Additionally, the apparatus is able to produce measurable results for comparison rather than just pass/fail. As shown in FIG. 2, the apparatus comprises a typical ink jet print head catcher assembly 24 connected such that every alternate electrode is shorted together; producing just two common connection points to all electrodes. This allows measurement of resistance between the electrodes or application of a voltage differential between electrodes. A D.C. 0–175V block 26 connects between every other lead in FIG. 1B to provide the voltage results in the table associated with EXAMPLE 4, below. Additionally, multimeter 28 reads the voltage or resistance measurements in the table of EXAMPLE 4. Finally, a +24 V D.C. power source 30 drives the catcher heater 18 to simulate the ink jet printhead during start up.

Experiments conducted in accordance with the present invention determined a resistance threshold between electrodes which would cause sufficient conductivity to cause a "catch" electrode to be pulled down to a "print" electrode when its neighbor was a print electrode. This effect is the most obvious indication of a high dried ink film conductivity. The resistance threshold was theoretically determined to be approximately 80K or twice the value of the pull-up resistor for each electrode (which is 41K). This would cause a "catch" droplet charge to be reduced by one third; usually enough to cause the "catch" droplet to become a "print" droplet.

Experiments essentially verified that when any electrode to electrode resistance dropped to about 80K (or less) print patterns using either one of those electrodes appeared as both electrodes printing. More importantly, experiments determined the ink film resistance threshold between electrodes which will cause a sufficient amount of current/power to pass between the electrodes and break down the ink film; causing arcing between the two electrodes when one is at high voltage ("catch") and the next at ground ("print"). This effect will not appear until a sufficient printing speed is reached, and since that is user dependent, a good formulation should allow adequate margin to allow the user to obtain high print speeds without damage to the print head.

Obviously this threshold would be difficult to predict since the area of interest involves the reaction of just two 0.004" wide electrodes separated by 0.00433" covered with an extremely thin layer (probably less than 0.0005") of conductive dried ink film.

A substantial number of experiments were conducted using carbon pigment inks which left ink film resistances across the electrodes. By measuring individual resistances between each consecutive electrodes and by applying a constant voltage differential between them, it was determined that the maximum power tolerable between any two electrodes was about 25 mW before the ink would break down and arcing would occur which in turn could destroy the epoxy (used to bond the electrodes to the "catcher") between the electrodes.

Using this data, and the fact that the electrode charge voltage could be as high as 175 volts, the minimum resistance between any two adjacent electrodes can be calculated to 1.2 MΩ. However, for most applications it is not realistic to expect the charge electrode voltage differential to exist 100% of the time but more realistic to expect a worst case of perhaps 37.5% of the time. Therefore, for an average power of 25 mW, a power of 66 mW could be tolerated at a 37.5% duty cycle. Using this new threshold, the minimum resistance between any two adjacent electrodes can be calculated to approximately 464 KΩ.

By obtaining the previous information, it was now possible to summarize the ability of the test apparatus to evaluate the conductivity of different ink formulations.

The test apparatus could be used to directly measure the net resistance of film of ink applied to the electrodes, but it should be realized that it is just that, i.e., a net of 128 parallel resistors. Meaning, the film will not be applied uniformly, and will not react to heat/drying uniformly, such that the true result is actually the distribution of a relatively wide range of parallel resistances. The total resistance measurement theoretically could be a measurement of just two electrodes which just happen to be much lower than all the rest or the total measurement could be a measurement of 128 equal parallel resistors (or total divided by 128 at any two electrodes). Using those extremes, it could be determined that when using the test apparatus to measurement a film resistance, a measurement of 464 KΩ would definitely be desirable, since the resistance between any two electrodes could be 464 KΩ to 59 MΩ (464×128) which is acceptable through that entire range. A measurement of 3.6 KΩ would definitely be undesirable, since the resistance between any two electrodes could be 3.6 KΩ to 464 KΩ (3.6×128) which is not acceptable through entire range. It was determined that the measurement (as expected) realistically indicated a measurement of an area of about 10 to 15 electrodes of approximately equal resistances. This use of the test apparatus proves to be very effective for comparisons and for quickly identifying extremely good/bad formulations.

Another test using the same test apparatus was developed to directly measure the threshold where ink breakdown/arcing will occur. In this case, a voltage differential is applied to the two common electrode points and gradually increased to the voltage where arcing was observed. Just as the resistance measurements would indicate, the arcing would usually first occur in just one area (at the 10 to 15 electrodes where the resistance is lowest). The ideal voltage differential possible in a typical ink jet system is 175 volts. However, as discussed before, it would be acceptable to assume that this maximum voltage at worst case may be switching at a 37.5% duty cycle. Therefore, an acceptable constant voltage differential for this test apparatus would be 66 volts. Utilizing this simple test apparatus and the two tests described above, it is possible to efficiently conduct accurate bench testing of ink formulations. A procedure was established to use the test apparatus in a manner which would mimic the typical ink jet print head start-up and produce measurable results by which to judge many ink formulations.

The established procedure comprises the steps of: (1) ensuring that electrode resistance measurement with electrodes clean and dry is greater than 4 MΩ and the catcher is cool, i.e., the heater is off; (2) applying a thin film of test ink across all electrodes, such as by using a swab; (3) energizing the catcher heater for a predetermined time period, such as three minutes, which will evaporate all moisture from the ink; (4) turning the catcher heater off and monitoring the net resistance of the electrodes to obtain an equilibrium value; (5) applying a low voltage differential to the electrodes and gradually increasing to the point where arcing is observed at some spot on the electrodes; and (6) removing the voltage.

The ink jet ink composition of the present invention comprises a liquid vehicle, a pigment, a pH adjusting component, and a chemical with a plurality of electron donating groups. The pH adjusting component preferably comprises an amine. The liquid vehicle is typically selected from the group consisting of a wetting agent, a biocide, denatured alcohol, deionized water, a corrosion inhibitor, a lower alphatic alcohol, and mixtures thereof.

The invention is illustrated in more detail with the following examples. All the measurements quoted in examples were made using the above mentioned in the house apparatus.

EXAMPLE 1

Dispersion/dye were evaluated for their dried film resistivity. The following table shows results of a carbon pigment dispersion along with a conventional dye based ink jet ink:

TABLE 1

| Dispersion/Ink | Resistivity | Voltage |
|---|---|---|
| Scitex 5000 Black ink 4 volts | >20 MΩ | >175 |
| Orient black 144 dispersion volts | 790 Ω | 15 |

EXAMPLE 2

When some of the commonly used additives are incorporated in a carbon pigment dispersion, although dry film resistivity changes somewhat, it is not sufficiently high to avoid charge lead to charge lead shorts. A following formulation was made:

| Component | % by weight |
|---|---|
| Orient black 144 dispersion | 20 |
| Surfynol TGE | 0.3 |
| Dimethyl amino ethanol | 2.0 |
| water | 77 |
|  | 100 |

The dried film resistivity of the above formulation was as follows:

| Resistivity | 85Ω |
|---|---|
| Voltage | <15V |

EXAMPLE 3

To the above mentioned formulation in Example 2, polypropylene glycol molecular weight 425 (P-425) was added in various concentrations. The dried film resistivity results are given below:

| % by weight | Resistivity | Voltage |
|---|---|---|
| 1.5 | 2.6kΩ | 30V |
| 2 | 75 kΩ | 70V |
| 2.3 | 210 kΩ | 100V |
| 4 | 890 kΩ | >175V |

Above results confirm that incorporation of long chain poly glycols improve the dry film resistivity of carbon pigment inks.

EXAMPLE 4

Various other materials were evaluated to improve dried film resistivity. The materials were incorporated in the formulation described in the Example 2. Results of dried film resistivity and voltage are tabulated in the following table:

| Compound (% by weight) | Resistivity (ohms) | Voltage (volts) |
|---|---|---|
| None | 660 | — |
| 2% surfynol TGE | 100 | — |
| 1% surfynol 465 | 170 | — |
| 1% surfynol ct-141 | 250 | — |
| 1% dipropylene glycol | 600 | — |
| 2% Ethylene glycol | 450 | — |
| 2% polyethylene glycol-300 | 3 kΩ | 20V |
| 4% polyethylene glycol-300 | 130 kΩ | 80V |
| 2% polypropylene glycol-1025 | 60 kΩ | 83V |
| 2% glycerol | 8 kΩ | 56V |
| 2% arcosolve PTB | 250 | — |
| 2% 1,5 pentanediol | 330 | — |
| 2% 1,2,6-trihydroxy hexane | 2.5 kΩ | 34V |
| 2% pentaethylene glycol | 4.2 kΩ | 30V |
| 2% 1,2,4-butanetriol | 4 kΩ | 35V |
| 2% citric acid | 1 MΩ | >20V |
| 2% tartaric acid disodium salt | 440 kΩ | 130V |
| 4% D-sorbitol | 1.5MΩ | 93V |

It is interpreted from the above results that polyglycols of varying molecular weight greater than 100 show improvement in dried film resistivity. In addition, trihydroxy compounds also show improved dried film resistivity. Based on the results of tartaric acid and citric acid, it becomes clear that a minimum of three electron donating groups in close vicinity to each other are required to attach on adjacent or near to adjacent bare carbon particle surface in a carbon backbone molecular chain to improve dried film resistivity.

Industrial Applicability and Advantages

The present invention is useful in the field of ink jet printing, and has the advantage of formulating a modified carbon pigment ink for use in ink jet printing ink which has provides improved dried film resistivity of carbon pigment ink jet inks. The present invention has the further advantage of providing a process by which essential dried ink film resistivity is improved to avoid any charge lead to charge lead shorts.

The invention has been described in detail with particular reference to certain preferred embodiments thereof, but it will be understood that modifications and variations can be effected within the spirit and scope of the invention.

We claim:

1. An ink jet ink composition comprising a liquid vehicle, a carbon pigment, a pH adjusting component, and a chemical having less than five electron donating groups.

2. An ink jet ink composition as claimed in claim 1 wherein the electron donating groups are situated in close proximity to each other to provide high dried film resistivity.

3. An ink jet ink composition as claimed in claim 1 wherein the chemical having less than five electron donating groups comprises 2% glycerol by weight.

4. An ink jet ink composition as claimed in claim 1 wherein the pH adjusting component comprises an amine.

5. A process for generating images which comprises incorporating into an ink jet printing apparatus the ink composition of claim 1 and forming images by causing the ink to be expelled in droplets onto a substrate, thereby generating an image on the substrate.

6. A process as claimed in claim 5 wherein the image is generated by a continuous stream ink jet printing process.

7. An ink jet composition as claimed in claim 1 wherein the liquid vehicle is selected from the group consisting of a wetting agent, a biocide, denatured alcohol, deionized water, and mixtures thereof.

8. An ink jet composition as claimed in claim 7 wherein the liquid vehicle is selected from the group consisting of a wetting agent, a biocide, denatured alcohol, deionized water, a corrosion inhibitor, a lower alphatic alcohol, and mixtures thereof.

* * * * *